(12) United States Patent
Leitner

(10) Patent No.: US 6,647,669 B1
(45) Date of Patent: Nov. 18, 2003

(54) SUPPORTING FRAME WITH ASSEMBLAGE NODES AND BRACES

(76) Inventor: Burkhardt Leitner, Am Bismarckturm 39, 70192 Stuttgart (DE)

( * ) Notice: Subject to any disclaimer, the term of this patent is extended or adjusted under 35 U.S.C. 154(b) by 0 days.

(21) Appl. No.: 09/319,639

(22) PCT Filed: Dec. 16, 1997

(86) PCT No.: PCT/EP97/07065

§ 371 (c)(1),
(2), (4) Date: Jun. 8, 1999

(87) PCT Pub. No.: WO98/27290

PCT Pub. Date: Jun. 25, 1998

(30) Foreign Application Priority Data

Dec. 19, 1996 (DE) .......................... 196 52 969

(51) Int. Cl.[7] .............................................. E04H 12/00
(52) U.S. Cl. .................................. 52/DIG. 4; 52/655.1
(58) Field of Search ........................... 52/653.1, 655.1, 52/DIG. 4, 653.2, 81.3, 280, 645; 403/170, 171, 172, 173, 217, 252, DIG. 1; 446/92, 97, 129, 130, 131, 132, 133, 137, 138, 139, 376–383

(56) References Cited

U.S. PATENT DOCUMENTS

| 3,632,147 A | * | 1/1972 | Finger ..................... 287/189.36 |
| 4,038,775 A | * | 8/1977 | Sato ............................. 446/92 |
| 4,912,864 A | * | 4/1990 | Price ............................ 40/600 |
| 5,008,984 A | * | 4/1991 | Levy ............................ 24/303 |
| 5,261,194 A | * | 11/1993 | Roberts ....................... 52/81.1 |
| 5,432,986 A | * | 7/1995 | Sexton ......................... 24/303 |
| 5,732,518 A | * | 3/1998 | Roberts ........................ 52/245 |
| 5,938,134 A | * | 8/1999 | Shields et al. .............. 242/127 |
| 6,377,149 B1 | * | 4/2002 | Miyata ........................ 335/306 |

FOREIGN PATENT DOCUMENTS

| DE | 1802638 | | 9/1975 | |
| DE | 3151353 | * | 3/1983 | ............ F16B/7/10 |
| DE | 2420864 | | 2/1984 | |
| DE | 3726469 | | 2/1989 | |
| DE | 19526192 | | 1/1996 | |
| GB | 2131847 | | 6/1984 | |
| GB | 2257173 | | 1/1993 | |

OTHER PUBLICATIONS

Sax, N. Irving and Lewis, Richard J., Hawley's Condensed Chemical Dictionary, 1987, Van Nostrand Reinhold Company Inc., 11th edition, pp. 43–44 & 718.*

* cited by examiner

Primary Examiner—Carl D. Friedman
Assistant Examiner—Kevin McDermott
(74) Attorney, Agent, or Firm—Ostrolenk, Faber, Gerb & Soffen, LLP

(57) ABSTRACT

The invention relates to a supporting frame with assemblage nodes and braces, which is characterized in that the joint between the assemblage nodes (3) and the end parts (27) of the braces (5) comprises a pin joint, that at least one of the elements (braces (5)) of the pin joint (11) which can be plugged into each other has at least one magnet (29), and that at least a partial area of the corresponding counter-part (pin (13)) is ferromagnetic.

12 Claims, 2 Drawing Sheets

SUPPORTING FRAME WITH ASSEMBLAGE NODES AND BRACES

DESCRIPTION

Figure 1:
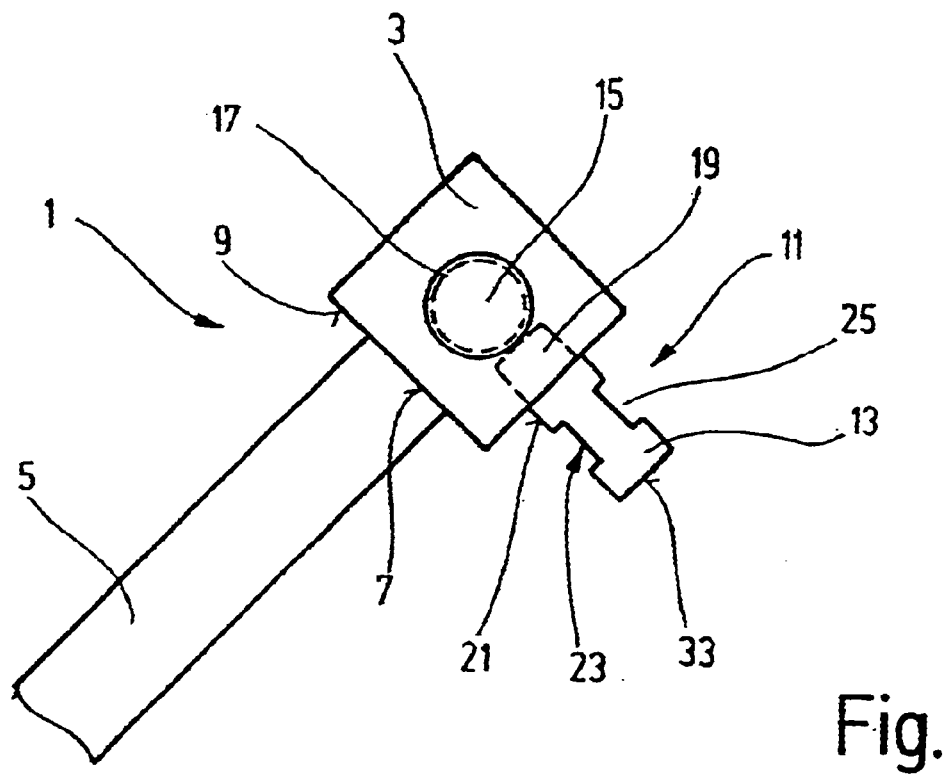

The invention concerns a supporting framework with connecting joints and braces, which is used for example in the field of exhibition or fair construction and conventional construction.

Braces are known which are connected together in the region of the connecting joints and are fastened with screws at the connecting joints in order to provide the necessary stability. However, it has been shown that even with demountable systems, connection methods of that type are relatively expensive and therefore can only be produced at relatively high costs.

That is why the aim of the invention is to create a supporting framework which does not have this disadvantage.

To solve this problem, a supporting framework is proposed which has connecting joints and braces, characterized in that the connection between a connecting joint (3) and the end region (27) of a brace (5) comprises a plug-in connection (11), in that at least one of the plug-in connection (11) elements (such as brace(5)) which can be plugged into each other has at least one magnet, and that the counterpart acting in combination with this element is ferromagnetic. By using a plug-in connection to make the connection between the connecting joints and the end regions of the braces, a simple and inexpensive connection is possible. At least one of the plug-in connector elements, which can be plugged-in to each other, has as well at least one magnet. The associated counterpart acting in combination with this element is ferromagnetic, at least at a region thereof, so that a reliable connection, protected against inadvertent loosening of the elements plugged into each other, is ensured.

A preferred form of design of the supporting framework is distinguished by the braces being developed in tubular form at least in one end region allocated a joint and this tubular end region providing the receptacle for a magnet and/or a ferromagnetic counterpart. The tubular end region is capable of absorbing very high connection forces, while the weight of the brace remains relatively low due to the tubular form.

Additional designs are disclosed as well.

Figure 2:
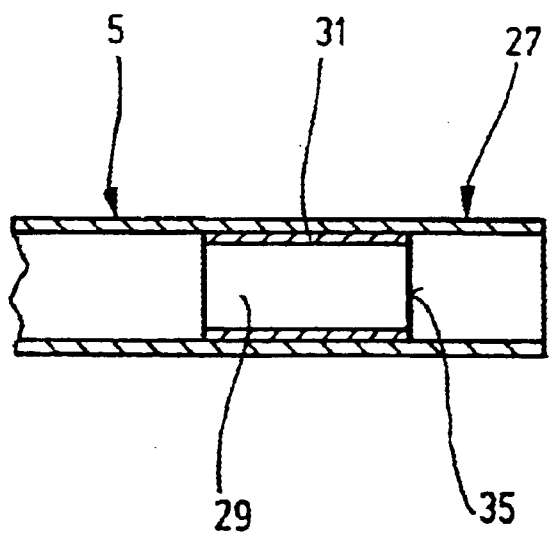
Figure 3:
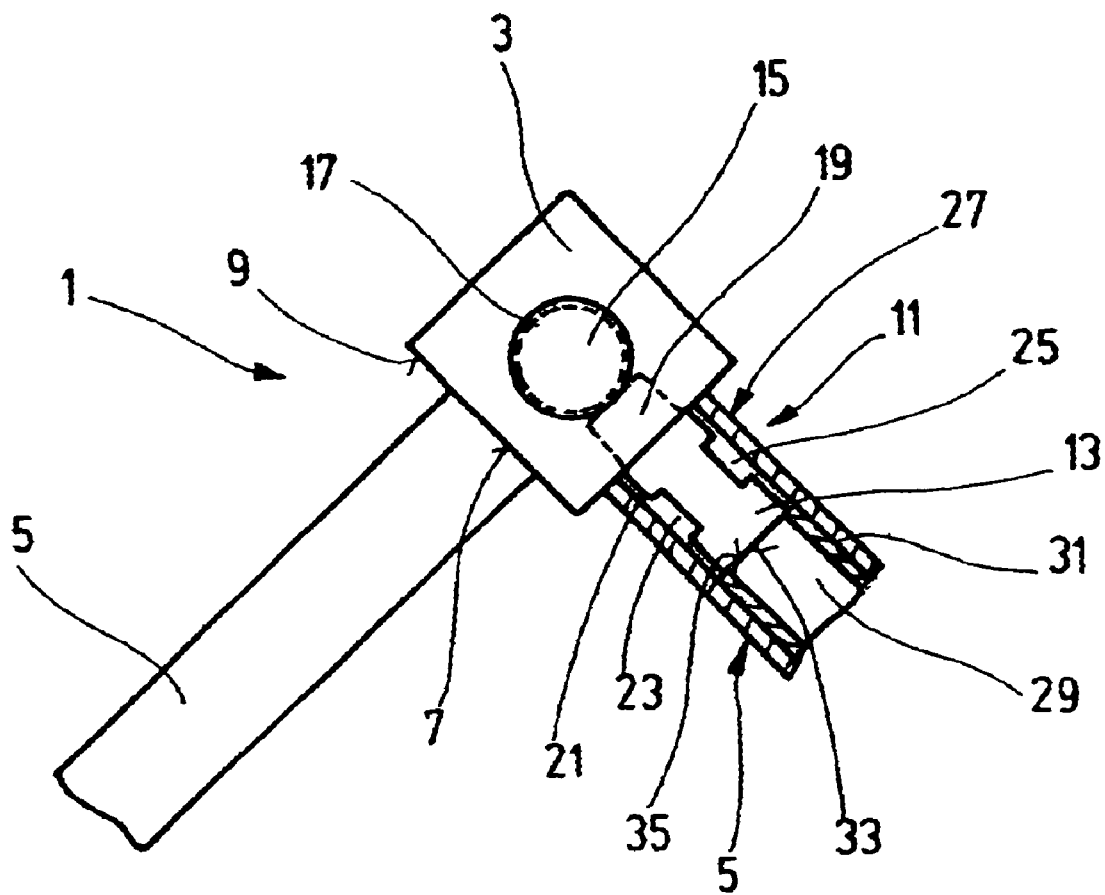

The invention is explained in more detail below with reference to the drawing, which shows:

in FIG. 1 a side view of a connecting joint and a brace, in FIG. 2 a diagrammatic partial section through the end region of a brace, and in FIG. 3 an assembled joint.

The supporting framework described below is preferably used for systems which are frequently demounted and reconstructed, for example for exhibition or fair buildings. Obviously the application to the conventional construction field is also certainly feasible.

The supporting structure consists of a plurality of connecting joints and braces. FIG. 1 shows the detail of a supporting structure 1, namely a connecting joint 3 and a brace 5 secured to it. The representation clearly shows that the end 7 of the brace 5 is connected directly to one side 9 of the connecting joint 3. The connecting joint 3 is formed in this case as a cube with square sides. However, any polyhedron or even a spherical connecting joint can also be used to produce a supporting framework with braces.

The brace 5 is connected to the connecting joint 3 by a plug-in connection 11 which consists of two elements which can be plugged into each other and at least one of which contains a magnet. The associated counterpart is ferromagnetic, at least as a region, i.e. at least the section of the counterpart, which is associated with the magnet, is attracted by it. It is also feasible to manufacture the counterpart completely from ferromagnetic material.

In the design example represented here, the plug-in connection 11 has a pin 13 which is attached to the connecting joint 3. For this purpose, a recess or drilled hole 15 is made in at least one, preferably all, of the sides 9 of the connecting joint 3. Manufacture of the connecting joint 3 is very easy, if the latter is penetrated by three mutually perpendicular drilled holes. The pin 13 can be inserted into its associated hole and suitably secured, even by using a special adhesive. In the design example represented here, it is assumed that the holes penetrating the connecting joint 3 are provided with an internal screw thread 17, in which a threaded projection 19 of the pin 13 engages. In the circumferential surface 21 of the pin 13, two opposed parallel plane faces 23 and 25 are provided, which are used as a gripping surface for a wrench, with which the pin 13 can be screwed into the internal screw thread 17.

It is clear from FIG. 2 that at least one end region, and preferably at both end regions, of the brace 5 is formed in a tubular shape. It is also conceivable to design the brace 5 as a continuous tube, so that the total weight of the supporting structure is reduced.

The tubular end region 27 of the brace 5 provides the receptacle for the pin 13. If the latter is inserted into the end of the brace 5, a plug-in connection 11 is produced which—depending on the length of the pin 13 and the dimensioning of the fit between the internal face of the brace 5 and the external face of the pin 13—can absorb large forces. Magnetic attraction forces are added to consolidate the connection between the connecting joint 3 and brace 5. For example, a magnet 29, which can be suitably mounted inside the brace 5, can be put into the end region 27. Purely by way of example, a fixing sleeve 31 is provided in this position. However, the mounting of the magnet 29 is not crucial for the creation of the plug-in connection 11 in the end region of the brace 5. Therefore the magnet can also be mounted by pins or screws running at right angles to the longitudinal axis of the brace 5. The mounting of the magnet inside the brace is however the most favourable, so that the external surface of the brace remains intact and consequently imparts a particularly attractive visual effect.

The distance of the magnet 29 from the end 7 of the brace 5 is chosen so that the end face 33 (see FIG. 1) of the pin 13 fits closely against the face 35 of the magnet 29. The pin 13 is ferromagnetic, at least in the region of its end face 33, in order to ensure the magnetic consolidation of the plug-in connection 11. Preferably it is manufactured completely from ferromagnetic material.

Therefore if the pin 13 is put into the tubular end region 27 of the brace 5, the magnet 29 attracts the pin 13 so that the pin 13 is securely held inside the brace 5. Additionally, as previously mentioned, retention forces can be guaranteed because a frictional lock is produced between the inner surface of the brace 5 and the outer surface of the pin 13.

Since the orientation of the pin 13 in a screwed connection with the connecting joint 3 is not guaranteed with regard to the rotational axis of the pin 13, preference is given to a cylindrical pin which engages in a cylindrical sleeve or the cylindrical end region 27 of the brace. Of course the brace can have a peripheral surface of any arbitrary shape, but the only essential thing is that a cylindrical receptacle for the pin 13 is provided in the tubular end region 27. What is clear is that a non-cylindrical pin also can be combined with a corresponding receptacle in the end region 27 of a brace 5. In all cases, the plug-in connection 11 is consolidated by the provision of the magnetic forces. At the same time, it is emphasised that the magnet 29 also can be replaced by a ferromagnetic part, provided that the pin 13 is formed as a magnet, at least in its end region.

It is clear in all other respects from the comments on FIGS. 1 and 2 that, instead of a pin 13, a sleeve which can be combined with the connecting joint 3 also can be used, into which is plugged a brace 5 or a pin-shaped extension leading out of the brace. It is also essential here that the plug-in connection produced by its is stabilised and consolidated with the aid of magnetic forces, the magnet and the ferromagnetic counterpart in this case also being interchangeable.

Depending on the location in which the connecting joint 3 is used, one or a maximum of four pins are screwed into the cube-shaped connecting joint and connected to braces, in the case of a polyhedral-shaped connecting joint with more than four external faces, more than six braces also can be attached to a connecting joint with appropriate dimensioning of the diameter of the brace. Moreover, it also feasible to design the connecting joint as a sphere and to provide it with several holes in which pins can be inserted, as explained with reference to FIG. 1.

In all cases, a supporting framework can be produced, which can be easily constructed and demounted and in which large forces can be absorbed by the plug-in connection between braces and connecting joints, and at the same time a very high protection against inadvertent loosening of the connection is provided by the magnetic forces.

What is claimed is:

1. A supporting framework with connecting joints and braces, wherein at least one connection between a connecting joint and an end region of a brace comprises a plug-in connection between connecting elements on the joint and brace, respectively, wherein at least one of the connecting elements has a magnet, and the other connecting element is ferromagnetic.

2. A supporting framework according to claim 1, wherein said brace is tubular-shaped in said end region.

3. A supporting framework according to claim 2, wherein the tubular end region receives said ferromagnetic element.

4. A supporting framework according to claim 2, wherein the tubular end region receives said magnet.

5. A supporting framework according to claim 4, wherein said magnet is press-fitted into said end region.

6. A supporting framework according to claim 4, wherein said magnet is adhered in said end region by an adhesive.

7. A supporting framework according to claim 2, wherein the brace is tubular-shaped in two opposite end regions.

8. A supporting framework according to claim 1, wherein said brace is tubular-shaped in said end region and wherein the connecting joint has at least one pin that can be plugged into said end region of said brace.

9. A supporting framework according to claim 8, where the connecting joints are formed in polyhedral shape with a plurality of sides, where at least one of the sides is capable of receiving a pin.

10. A supporting framework according to claim 9, where the pin is screwed into the connecting joint.

11. A supporting framework according to claim 1, where the connecting joints are formed in polyhedral shape with a plurality of sides, where at least one of the sides is capable of receiving a pin.

12. A supporting framework according to claim 11, where in the pin is screwed into the connecting joint.

* * * * *